(12) United States Patent
Sakurai et al.

(10) Patent No.: US 7,399,230 B2
(45) Date of Patent: Jul. 15, 2008

(54) POWER TRANSMISSION SHAFT

(75) Inventors: Katsuhiro Sakurai, Shizuoka-ken (JP); Kisao Yamazaki, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 145 days.

(21) Appl. No.: 10/982,756

(22) Filed: Nov. 5, 2004

(65) Prior Publication Data

US 2005/0101392 A1    May 12, 2005

(30) Foreign Application Priority Data

Nov. 12, 2003   (JP)   ............................. 2003-382831

(51) Int. Cl.
*F16C 3/00* (2006.01)
(52) U.S. Cl. .................. 464/182; 29/DIG. 49
(58) Field of Classification Search ............... 148/567, 148/570, 571, 572, 573; 29/90.7, 90.01, 29/DIG. 49; 72/714, DIG. 49; 464/182, 464/905, 906
See application file for complete search history.

(56) References Cited

U.S. PATENT DOCUMENTS 3,024,626 A * 3/1962 Frischman .................. 464/179
6,319,337 B1   11/2001 Yoshida et al.
6,390,924 B1   5/2002 Yoshida et al.
2002/0017343 A1 * 2/2002 Yoshida et al. ............... 148/328
2002/0173363 A1 * 11/2002 Makino et al. ............... 464/182

FOREIGN PATENT DOCUMENTS

EP    1 016 801 A1    7/2000

* cited by examiner

*Primary Examiner*—Greg Binda
(74) *Attorney, Agent, or Firm*—Arent Fox LLP

(57) ABSTRACT

A technique for improving a strength, especially a fatigue strength of a power transmission shaft provided with a serrated portion for torque transmission such as a spline shaft. A power transmission shaft is serration-fitted to an inner joint member of respective constant velocity joints. A driveshaft is provided with a serrated portion as well as a smooth portion having a cylindrical outer circumferential surface. A cut-up portion is formed at the end portion of the serrated portion. When applying an induction hardening to the smooth portion and the serrated portion, a hardening ratio of the smooth portion is set at a different value from that of the serrated portion, and such that a fatigue strength of the smooth portion becomes equal to or greater than that of the serrated portion.

4 Claims, 3 Drawing Sheets

POWER TRANSMISSION SHAFT

BACKGROUND OF THE INVENTION

1. Field of the Invention

The present invention relates to a power transmission shaft coupled to a constant velocity joint for torque transmission.

2. Description of the Related Art

A power transmission shaft combined with a constant velocity joint is employed in various mechanical parts of an automobile, an industrial machine and so on. Such kind of power transmission shaft is usually coupled with a mating member (boss) fitted around an outer circumference thereof via a serration or a spline, for transmitting a torque to the mating member. The serrated shaft or the spline shaft is made of a medium carbon steel or a low-alloy steel, subjected to a heat treatment such as a surface hardening treatment or a thermal refining, more specifically a induction hardening, carburized quenching, nitriding, etc. for increasing a shaft strength, taking into consideration the plastic workability, mechanical workability and cost. The Japanese patent publication No. 3194093 discloses a technique for improving a shaft strength by a heat treatment, wherein a induction hardening and a carburized quenching is applied to a shaft-shaped mechanical part, so that a ratio of an effective depth of hardening against the part diameter is set in a range of 0.4 to 0.8.

According to the cited publication, the heat treatment is applied to the part without particular distinction of a serrated portion for torque transmission such as a spline and a smooth portion on a cylindrical surface where such serration is not formed. This can be construed as a result of performing the heat treatment simultaneously and under a same condition, on both of the serrated portion for torque transmission and the smooth portion, in which case a depth of hardening becomes substantially the same in the serrated portion for torque transmission and the smooth portion.

In recent years, along with the increasing social concern for the global environment, in the field of the automobile industry for example, more stringent emission control and improvement of fuel efficiency have come to be more severely demanded. In order to cope with such trend, there has been arising a strong demand for a lighter in weight yet stronger power transmission shaft, such as a propeller shaft or a driveshaft. Under such severe industrial circumstances, the invention according to the above-cited publication may not be able to fully meet the requirements.

Accordingly, it is an object of the present invention to provide a technique for improving a strength, especially a fatigue strength of a power transmission shaft provided with a serrated portion for torque transmission such as a spline shaft or a serrated shaft.

SUMMARY OF THE INVENTION

For achieving the foregoing object, the present invention provides a power transmission shaft coupled to an inner joint member or an outer joint member of a constant velocity joint, and provided with a smooth portion having an outer circumferential surface of a cylindrical shape and a serrated portion for torque transmission having a cut-up portion at an end portion thereof, wherein the smooth portion and the serrated portion for torque transmission are respectively induction-hardened, and a hardening ratio of the smooth portion is set at a different value from that of the serrated portion for torque transmission, such that a fatigue strength of the smooth portion becomes equal to or greater than a fatigue strength of the serrated portion for torque transmission.

The power transmission shaft herein referred to stands for a shaft member to be coupled to an inner joint member or an outer joint member of a constant velocity joint. The serrated portion for torque transmission is provided with notches for torque transmission formed along an axial direction and aligned in a circumferential direction, so as to transmit a torque to a mating member (boss) by getting engaged with notches of the mating member fitted on an outer circumference of the shaft, typically seen in a spline or a serration. The end portion of the serrated portion for torque transmission designates an end portion on the side of the other end of the shaft in the serrated portion formed on the one end of the shaft. Also, "cut-up portion" means region that, in a serrated portion for torque transmission A1, A2 including a minor diameter portion 11 and a major diameter portion 12 as shown in FIG. 2, a diameter of the minor diameter portion 11 is expanded in a radial direction, so as to meet an outer circumferential surface 4a of the shaft 4 at the end portion of the serrated portion, where the minor diameter portion 11 and the major diameter portion 12 meet.

FIG. 4 shows results of a fatigue test (fatigue test under completely reversed torsion) carried out by the present inventor for establishing a relation between a depth of hardening and a fatigue strength. In FIG. 4, the horizontal axis represents a hardening ratio (depth of hardening a/radius r), and the vertical axis represents a strength ratio with respect to a reference strength 1 corresponding to the hardening ratio of 0.35, based on a maximum shearing stress data obtained from repetitions of 300,000 times. Circular marks plotted in FIG. 4 represent data of a smooth portion, while square marks represent data of a serrated portion for torque transmission. Here, referring to the serrated portion for torque transmission, the "depth of hardening" in the above formula is a value of a minor diameter portion of the serration, and the "radius" is that of a minor diameter portion.

Referring first to the smooth portion, as is apparent in view of FIG. 4, the strength ratio shows an upwardly protruding feature (shown by a solid line) with respect to the hardening ratio, with a peak of fatigue strength around the hardening ratio of 0.5 to 0.6, and the fatigue strength drops with both an increase or a decrease of the hardening ratio. By contrast, in the serrated portion for torque transmission, though an upwardly protruding feature (shown by a dotted line) is also seen with a peak of the fatigue strength around the hardening ratio of 0.3, an extent of decrease in the fatigue strength on both sides of the peak is milder than the case of the smooth portion. Therefore, it is understood that a fatigue strength depends on a depth of hardening more largely in the smooth portion than in the serrated portion for torque transmission. Also, upon comparing a fatigue strength of the smooth portion and of the serrated portion for torque transmission under a same hardening ratio, it has been proven that a fatigue strength of the serrated portion for torque transmission is superior to that of the smooth portion when the hardening ratio is low, while a fatigue strength of the smooth portion is superior to that of the serrated portion for torque transmission when the hardening ratio is high.

Based on the foregoing findings, it is understood that setting a hardening ratio of the smooth portion such that a fatigue strength of the smooth portion becomes at least equal to, or greater than that of the serrated portion for torque transmission, which is less variable, permits stably securing a high fatigue strength of an entirety of a shaft. In this case, setting a hardening ratio of the smooth portion at a different value from that of the serrated portion for torque transmission permits securing a peak value of fatigue strength both in the smooth portion and in the serrated portion for torque transmission, thereby increasing the fatigue strength over an entirety of the shaft.

As shown in FIG. 4, it is where a hardening ratio of the smooth portion is 0.40 or more, that a fatigue strength of the smooth portion exceeds a practically applicable value (strength ratio approx. 0.85). On the other hand, in the case where a hardening ratio of the smooth portion exceeds 0.70, a fatigue strength of the smooth portion drops below a permissible extent. Therefore, it is desirable to set a hardening ratio of the smooth portion to be 0.40 or more (more preferably, 0.45 or more), but 0.70 or less (more preferably 0.65 or less).

Also, it is desirable to set a hardening ratio of the serrated portion for torque transmission to be 0.20 or more (more preferably 0.30 or more), but 0.60 or less (more preferably 0.57 or less). It is because in case where a hardening ratio is below 0.20 a stable hardening effect cannot be achieved, while when a hardening ratio exceeds 0.60 a fatigue strength of the serrated portion for torque transmission drops significantly.

Further, applying a shot peening process to the serrated portion for torque transmission and the smooth portion increases a compression residual stress of a surface thereof, thereby further enhancing the fatigue strength. In this case, it is preferable to perform the shot peening twice or more (desirable twice), for attaining a more compression residual stress.

According to the present invention, since a maximal fatigue strength can be secured both in a smooth portion and in a serrated portion for torque transmission, a fatigue strength can be improved over an entirety of a power transmission shaft.

DESCRIPTION OF THE PREFERRED EMBODIMENT

Hereunder, an embodiment of the present invention will be described referring to the accompanying drawings.

Figure 1:
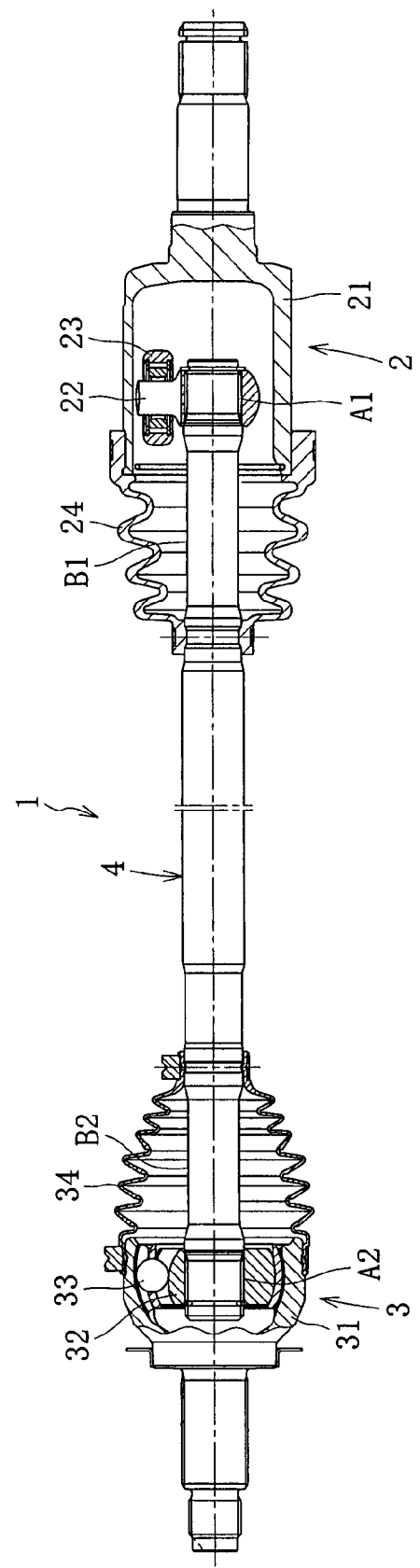
FIG. 1 is a cross-sectional view showing a driveshaft.

FIG. 1 is a cross-sectional view showing a driveshaft for a vehicle such as an automobile, provided with a sliding type constant velocity joint 2 and a fixed type constant velocity joint 3 on the respective end portions thereof, via which the driveshaft 1 is connected to a driving system. In the case of the driveshaft shown in FIG. 1, a central side portion (inboard side) thereof in a widthwise direction of the vehicle is linked to a differential gear (not shown) via a tripod type constant velocity joint 2, while an outer portion (outboard side) in a widthwise direction of the vehicle is linked to an axle (not shown) via a Rzeppa type constant velocity joint 3. On the respective end portions of the driveshaft 1, various types of constant velocity joint may be provided, without limitation to the constant velocity joint 2, 3 shown in FIG. 1.

The constant velocity joint 2, 3 are basically constituted of cup-shaped outer joint member 21, 31, inner joint member 22, 32 disposed inside the outer joint member, and torque transmission member 23, 33 which transmit a torque between the outer joint member 21, 31 and the inner joint member 22, 32.

In the tripod type constant velocity joint on the inboard side, rollers are employed as the torque transmission member 23, while balls are employed as the torque transmission member 33 of the Rzeppa type constant velocity joint on the outboard side. Respective end portions of a solid intermediate shaft 4 are serration-fitted along an inner circumferential surface of the inner joint member 22, 32, so that the torque transmission is performed via the serration-fitted portion between the constant velocity joint 2 and 3.

Figure 2:
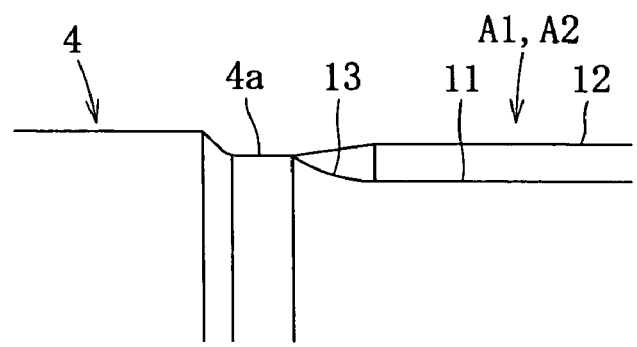
FIG. 2 is an enlarged cross-sectional view showing a configuration of an end portion of a serrated portion.

The intermediate shaft 4 is provided with serrated portion A1, A2 on the respective end portions thereof, which serve as serrated portions for torque transmission. The serrated portion A1 on the inboard side is provided with a serration formed along an axial direction, and a diameter of and end portion of the minor diameter portion 11, out of the minor diameter portion 11 and the major diameter portion 12 of the serrated portion, is expanded in a direction that forms an arc shape cross-section, so as to meet an outer circumferential surface 4a of the shaft 4, as shown in FIG. 2. The expanded surface 13 (cut-up portion) of the end portion of the minor diameter portion 11 may be formed in a cylindrical shape, or a spherical shape. The serrated portion A2 on the outboard side is of the same configuration as the serrated portion A1 on the inboard side.

The intermediate shaft 4 is provided with smooth portions having a cylindrical outer circumferential surface in a plurality of regions along an axial direction. Among those, the smooth portions B1, B2 having a smallest diameter (hereinafter simply referred to as "smooth portions") are respectively located on end potions of the intermediate shaft 4, and inside boots 24, 34 of the constant velocity joint 2, 3. A diameter ratio of the smooth portions B1, B2 with respect to the respective adjacent serrated portions A1, A2 (an outer diameter of the smooth portion/a minor diameter of the serrated portion) is set within a range of 0.95 to 1.05.

In the manufacturing process of the driveshaft 1, a carbon steel, for example an S40C to S45C medium carbon steel according to JIS is forged, and after plastic working of the serrated portions A1, A2 by cold rolling or cold press, an induction hardening applied to the overall driveshaft. It is desirable to perform the induction hardening twice to sufficiently apply a thermal effect to a core portion, to thereby form a dual phase structure of a ferrite and a martensite, though it is possible to form such dual phase structure in a core portion by a single hardening session when an appropriate measure is taken, for example using a relatively low frequency, prolong a heating time, prolong a cooling time after finishing the heating (delay time), etc.

A hardening ratio of the smooth portion B1, B2 after the hardening is to be set such that a fatigue strength of the smooth portion B1 becomes not less than a fatigue strength of the adjacent serrated portion A1 as already described, taking into consideration the characteristic of the smooth portion that a fatigue strength largely varies depending on a difference of a depth of hardening (likewise, such that a fatigue strength of the smooth portion B2 becomes not less than that of the serrated portion A2). Specifically, it is preferable to set a hardening ratio of the smooth portions B1 and B2 at 0.40 or more (more preferably 0.45 or more), but 0.70 or less (more preferably 0.65 or less), and to set a hardening ratio of the serrated portions A1 and A2 at 0.20 or more (more preferably 0.30 or more), but 0.60 or less (more preferably 0.57 or less), as well as at a different hardening ratio between the smooth portion and the serrated portion. Different hardening ratios can be determined by adjusting a depth of hardening, for example changing a power to be input to an induction hardening apparatus by portions, or changing a heating time, etc.

Figure 4:
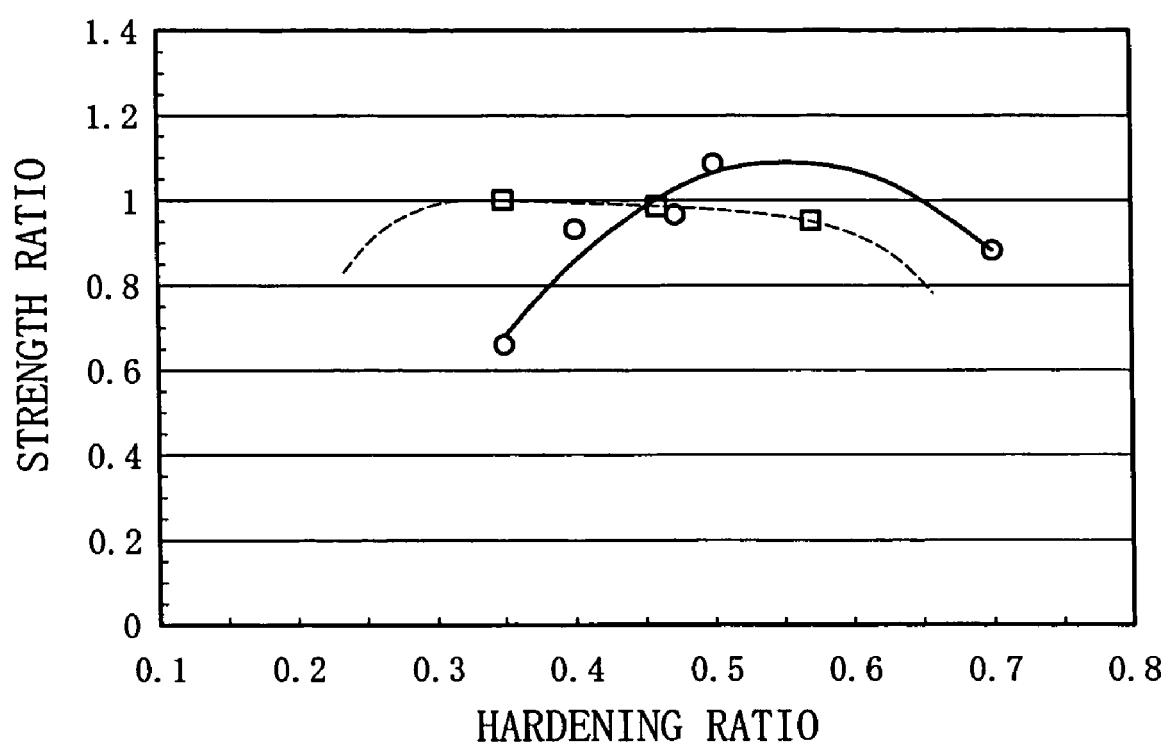
FIG. 4 is a line graph showing results of a fatigue test of a serrated portion for torque transmission and a smooth portion with respect to different hardening ratio values.

In the case of setting a fatigue strength of the smooth portions B1 and B2 equal to or greater than that of the serrated portions A1 and A2 as above, the portion where the fatigue strength is weakest is the serrated portion A1, A2. However, as is apparent in view of the test results shown in FIG. 4, a fatigue strength of the serrated portions A1, A2 is less variable depending on a hardening ratio, and stably stays in a high level. Therefore, setting a hardening ratio of the smooth portions B1, B2 so as to achieve a fatigue strength at least equal to or greater than that of the serrated portions A1, A2 permits achieving a high fatigue strength over an entirety of the intermediate shaft 4. In addition, setting different hardening ratios in the serrated portions A1, A2 and the smooth portion B1, B2 permits achieving a maximal value of the fatigue strength in the respective portions, thereby further increasing a fatigue strength of an entirety of the intermediate shaft 4. Also, since a fatigue strength of the serrated portions A1, A2 is less variable depending on a difference of hardening ratios, a possible variation in the hardening performance does not result in a visible difference in a fatigue strength value. Consequently, the quality of the driveshaft 1 can be stabilized.

After finishing the heat treatment, it is desirable to perform a shot peening process so as to increase a surface compression residual stress to 980 N/mm$^2$ or more, to thereby further increase a fatigue strength. The compression residual stress value may be achieved, for example by performing the shot peening twice. The shot peening may be applied to an entirety of the intermediate shaft 4, or alternatively to the serrated portions A1, A2 only, which are inferior in fatigue strength to the smooth portions B1, B2.

Further, while the foregoing embodiment refers to the intermediate shaft 4 of the driveshaft 1 as an example of the power transmission shaft, the scope of the present invention is not limited to the intermediate shaft 4, but is extensively applicable to a power transmission shaft that can be connected to the inner joint member 22, 32 or the outer joint member 21, 31 of the constant velocity joint 2, 3.

Figure 3:
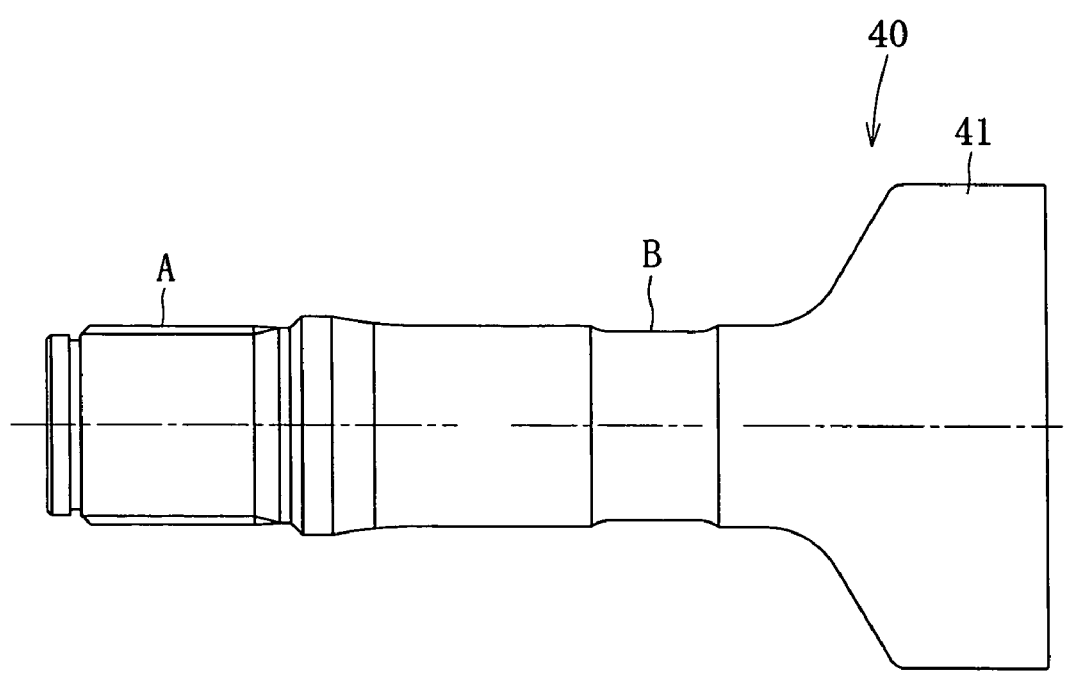
FIG. 3 is a side view showing a press-fitted stab shaft.

FIG. 3 shows a stab shaft 40 (a press-fitted stab shaft or a welded stab shaft) as an example of the power transmission shaft, which is provided with a serrated portion A on an end portion thereof for connection to the inner joint member 22, 32 of the constant velocity joint 2, 3, and a flange portion 41 on the other end portion thereof for press-fitting or welding a steel pipe. A smooth portion B of a smallest diameter is located between the flange portion 41 and the serrated portion A. Setting a hardening ratio of the serrated portion A and the smooth portion B according to the foregoing relation permits achieving a similar advantage.

What is claimed is:

1. A power transmission shaft coupled to one of an inner joint member and an outer joint member of a constant velocity joint, and provided with a smooth portion having an outer circumferential surface of a cylindrical shape and a serrated portion for torque transmission having a cut-up portion at an end portion thereof,
    wherein a core portion of the shaft is formed to have a dual phase structure of a ferrite and a martensite, and
    wherein said smooth portion and said serrated portion for torque transmission are respectively induction-hardened,
    a hardening ratio of said smooth portion is set at a different value from a hardening ratio of said serrated portion;
    a fatigue strength of said smooth portion is equal to or greater than a fatigue strength of said serrated portion;
    the hardening ratio of said serrated portion is equal to a depth of hardening of a minor diameter portion divided by a radius of the minor diameter portion; and
    a diameter ratio of an outer diameter portion of the smooth portion with respect to the minor diameter portion of the serrated portion is set within a range of 0.95 to 1.05.

2. The power transmission shaft according to claim 1, wherein the hardening ratio of said smooth portion is not less than 0.40 but not more than 0.70.

3. The power transmission shaft according to claim 2, wherein the hardening ratio of said serrated portion is not less than 0.20 but not more than 0.60.

4. The power transmission shaft according to claim 1, wherein a shot peening process is applied to said smooth portion and to said serrated portion.

* * * * *